United States Patent
Wagner et al.

(10) Patent No.: US 10,800,536 B2
(45) Date of Patent: Oct. 13, 2020

(54) PROPULSION SYSTEM FOR AN AIRCRAFT

(71) Applicant: General Electric Company, Schenectady, NY (US)

(72) Inventors: Nicholas Adam Wagner, Revere, MA (US); Daniel E. Bergsten, Topsfield, MA (US); David Allen Gutz, Wenham, MA (US)

(73) Assignee: General Electric Company, Schenectady, NY (US)

( * ) Notice: Subject to any disclaimer, the term of this patent is extended or adjusted under 35 U.S.C. 154(b) by 140 days.

(21) Appl. No.: 15/618,257

(22) Filed: Jun. 9, 2017

(65) Prior Publication Data

US 2018/0354635 A1 Dec. 13, 2018

(51) Int. Cl.
| | |
|---|---|
| *B64D 31/00* | (2006.01) |
| *B64D 27/24* | (2006.01) |
| *B64D 27/10* | (2006.01) |
| *B64C 27/04* | (2006.01) |
| *F02C 6/20* | (2006.01) |
| *B64C 27/12* | (2006.01) |

(Continued)

(52) U.S. Cl.
CPC .............. *B64D 31/00* (2013.01); *B64C 27/04* (2013.01); *B64C 27/12* (2013.01); *B64D 27/10* (2013.01); *B64D 27/24* (2013.01); *F02C 6/20* (2013.01); *F02C 6/206* (2013.01); *F02K 5/00* (2013.01); *B64D 2027/026* (2013.01); *F05D 2220/323* (2013.01); *F05D 2220/329* (2013.01)

(58) Field of Classification Search
CPC ............ B64D 31/00; B64D 27/24; F02C 6/20
See application file for complete search history.

(56) References Cited

U.S. PATENT DOCUMENTS

| | | | |
|---|---|---|---|
| 5,951,608 | A | 9/1999 | Osder |
| 6,012,676 | A | 1/2000 | Gold et al. |

(Continued)

FOREIGN PATENT DOCUMENTS

| | | | | |
|---|---|---|---|---|
| EP | 3162713 A1 | * | 5/2017 | ............ B64C 27/04 |
| EP | 3162713 A1 | | 5/2017 | |

(Continued)

OTHER PUBLICATIONS

European Search Report Corresponding to EP Application No. 181767294 dated Sep. 14, 2018.

(Continued)

*Primary Examiner* — Kira Nguyen
(74) *Attorney, Agent, or Firm* — Dority & Manning, P.A.

(57) ABSTRACT

A hybrid electric propulsion system includes a gas turbine engine and an electric machine coupled to the gas turbine engine. A method for operating the propulsion system includes determining, by one or more computing devices, a baseline power output for the gas turbine engine; operating, by the one or more computing devices, the gas turbine engine to provide the baseline power output; determining, by the one or more computing devices, a desired power output greater than or less than the baseline power output; and providing, by the one or more computing devices, power to, or extracting, by the one or more computing devices, power from, the gas turbine engine using the electric machine such that an effective power output of the gas turbine engine matches the determined desired power output.

22 Claims, 6 Drawing Sheets

(51) Int. Cl.
*F02K 5/00* (2006.01)
*B64D 27/02* (2006.01)

(56) References Cited

U.S. PATENT DOCUMENTS

| | | |
|---|---|---|
| 8,271,151 B2 | 9/2012 | Hasan et al. |
| 8,684,314 B2 | 4/2014 | Chaduc et al. |
| 8,825,342 B2 | 9/2014 | Schaeffer et al. |
| 9,193,479 B2 | 11/2015 | Moy et al. |
| 9,221,535 B2 | 12/2015 | Gordon et al. |
| 9,248,908 B1 | 2/2016 | Luyks |
| 9,446,842 B2 | 9/2016 | Luyks |
| 2010/0013223 A1 | 1/2010 | Certain |
| 2013/0184958 A1 | 7/2013 | Dyrla et al. |
| 2015/0285165 A1 | 10/2015 | Steinwandel et al. |
| 2016/0023773 A1* | 1/2016 | Himmelmann ........ B64D 27/10 60/778 |
| 2016/0083104 A1 | 3/2016 | Simonetti et al. |
| 2016/0167799 A1 | 6/2016 | Smaoui et al. |
| 2016/0177819 A1 | 6/2016 | Schwarz et al. |
| 2016/0325830 A1 | 11/2016 | Waltner et al. |
| 2017/0022899 A1 | 1/2017 | Schwarz et al. |
| 2017/0291712 A1* | 10/2017 | Himmelmann ........... F02C 6/00 |
| 2017/0297732 A1 | 10/2017 | Waltner et al. |
| 2017/0305541 A1* | 10/2017 | Vallart .................... F01D 13/00 |

FOREIGN PATENT DOCUMENTS

| | | |
|---|---|---|
| WO | WO2014/182616 A2 | 11/2014 |
| WO | WO 2016/049027 | 3/2016 |

OTHER PUBLICATIONS

JP Reasons for Refusal and English Translation thereof, JP Application No. 2018-108194, dated Jul. 16, 2019, 5 pages.

JP Written Opinion and English Translation thereof, JP Application No. 2018-108194, dated Oct. 2, 2019, 8 pages.

* cited by examiner

PROPULSION SYSTEM FOR AN AIRCRAFT

FIELD

The present subject matter relates generally to a hybrid electric propulsion system for the aircraft, and a method for operating a gas turbine engine of the exemplary hybrid electric propulsion system to minimize minor cycle damage.

BACKGROUND

A conventional helicopter generally includes a main rotor assembly and a tail rotor assembly. A gas turbine engine is included with an output shaft configured to drive the main rotor assembly and tail rotor assembly. As compared to, e.g., a fixed wing aircraft, helicopters are more frequently operated such that their flight envelope defines many minor cycles, such that a power output demand on the gas turbine engine is increased and decreased relatively frequently throughout the flight envelope of the helicopter.

With at least certain increases in power output demand, the gas turbine engine ramps up in speed to provide the additional power output. Further, with at least certain decreases in power output demand, the gas turbine engine slows down to provide the reduction in power output. However, these additional increases and decreases in rotational speed of the gas turbine engine may create minor cycle damage for the gas turbine engine over the life of the gas turbine engine. Accordingly, a method for operating a gas turbine engine of a propulsion system in a manner to reduce a number of minor cycles during a flight envelope of the helicopter would be useful.

BRIEF DESCRIPTION

Aspects and advantages of the invention will be set forth in part in the following description, or may be obvious from the description, or may be learned through practice of the invention.

In one exemplary embodiment of the present disclosure, a method for operating a hybrid electric propulsion system of an aircraft is provided. The hybrid electric propulsion system includes a gas turbine engine and an electric machine coupled to the gas turbine engine. The method includes determining, by one or more computing devices, a baseline power output for the gas turbine engine; operating, by the one or more computing devices, the gas turbine engine to provide the baseline power output; determining, by the one or more computing devices, a desired power output greater than or less than the baseline power output; and providing, by the one or more computing devices, power to, or extracting, by the one or more computing devices, power from, the gas turbine engine using the electric machine such that an effective power output of the gas turbine engine matches the determined desired power output.

In certain exemplary aspects the hybrid electric propulsion system further comprises an electric energy storage unit electrically connected to the electric machine.

For example, in certain exemplary aspects providing, by the one or more computing devices, power to, or extracting, by the one or more computing devices, power from, the gas turbine engine using the electric machine such that the effective power output of the gas turbine engine matches the determined desired power output comprises providing, by the one or more computing devices, electrical power to the electric machine from the electric energy storage unit, or extracting, by the one or more computing devices, electrical power from the electric machine to the electric energy storage unit.

For example, in certain exemplary aspects providing, by the one or more computing devices, power to, or extracting, by the one or more computing devices, power from, the gas turbine engine using the electric machine such that the effective power output of the gas turbine engine matches the determined desired power output comprises providing, by the one or more computing devices, a differential amount of power to, or extracting, by the one or more computing devices, a differential amount of power from, the gas turbine engine using the electric machine, wherein the differential amount of power is between about one percent and about twenty percent of the baseline power output.

For example, in certain exemplary aspects, the method further includes determining, by the one or more computing devices, an average of the desired power output is greater than or less than the baseline power output of the gas turbine engine, and wherein determining, by one or more computing devices, the baseline power output for the gas turbine engine comprises modifying, by the one or more computing devices, the baseline power output in response to determining the average of the desired power output is greater than or less than the baseline power output of the gas turbine engine.

For example, in certain exemplary aspects, the method includes determining, by the one or more computing devices, a state of charge of the electric energy storage unit, and wherein determining, by one or more computing devices, the baseline power output for the gas turbine engine comprises modifying, by the one or more computing devices, the baseline power output in response to determining the state of charge of the electric energy storage unit.

For example, in certain exemplary aspects determining, by the one or more computing devices, the state of charge of the electric energy storage unit further comprises determining, by the one or more computing devices, the state of charge is greater than or less than a predetermined threshold.

For example, in certain exemplary aspects determining, by the one or more computing devices, the state of charge of the electric energy storage unit further comprises determining, by the one or more computing devices, a change in the state of charge over a time period is greater than or less than a predetermined threshold.

In certain exemplary aspects the gas turbine engine is a turboshaft engine including an output shaft and wherein the electric machine is coupled to the output shaft. For example, in certain exemplary aspects the aircraft is a helicopter having a propeller, and wherein the output shaft drives the propeller. For example, in certain exemplary aspects determining, by the one or more computing devices, the desired power output greater than or less than the baseline power output comprises receiving, by the one or more computing devices, an input from a collective of the helicopter; and determining, by the one or more computing devices, the desired power output based on a vehicle model and the received input from the collective of the helicopter.

In certain exemplary aspects operating, by the one or more computing devices, the gas turbine engine to provide the baseline power output comprises rotating a core of the gas turbine engine at the first rotational speed, and wherein providing, by the one or more computing devices, power to, or extracting, by the one or more computing devices, power from, the gas turbine engine using the electric machine such that the effective power output of the gas turbine engine matches the determined desired power output comprises rotating the core of the gas turbine engine at substantially the first rotational speed.

In an exemplary embodiment of the present disclosure, a hybrid electric propulsion system for an aircraft is provided. The propulsion system includes a gas turbine engine including a turbine and an output shaft, the turbine drivingly coupled to the output shaft. The propulsion system also includes an electric machine coupled to the output shaft and a controller. The controller includes memory and one or more processors, the memory storing instructions that when executed by the one or more processors cause the hybrid electric propulsion system to perform functions. The functions include determining a baseline power output for the gas turbine engine; operating the gas turbine engine to provide the baseline power output; determining a desired power output greater than or less than the baseline power output; and providing power to, or extracting power from, the gas turbine engine using the electric machine such that an effective power output of the gas turbine engine matches the determined desired power output.

In certain exemplary embodiments the gas turbine engine is a turboshaft engine. For example, in certain exemplary embodiments the aircraft is a helicopter having a propeller, and wherein the output shaft is configured to drive the propeller. For example, in certain exemplary embodiments determining the desired power output includes: receiving an input from a collective of the helicopter; and determining the desired power output based on a vehicle model and the received input from the collective of the helicopter.

In certain exemplary embodiments the propulsion system further includes an electric energy storage unit electrically connectable to the electric machine. For example, in certain exemplary embodiments providing power to, or extracting power from, the gas turbine engine using the electric machine such that the effective power output of the gas turbine engine matches the determined desired power output comprises providing power to the electric machine from the electric energy storage unit, or extracting power from the electric machine to the electric energy storage unit.

In certain exemplary embodiments providing power to, or extracting power from, the gas turbine engine using the electric machine such that the effective power output of the gas turbine engine matches the determined desired power output comprises providing a differential amount of power to, or extracting a differential amount of power from, the gas turbine engine using the electric machine. For example, in certain exemplary embodiments the differential amount of power is between about one percent and about twenty percent of the baseline power output.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
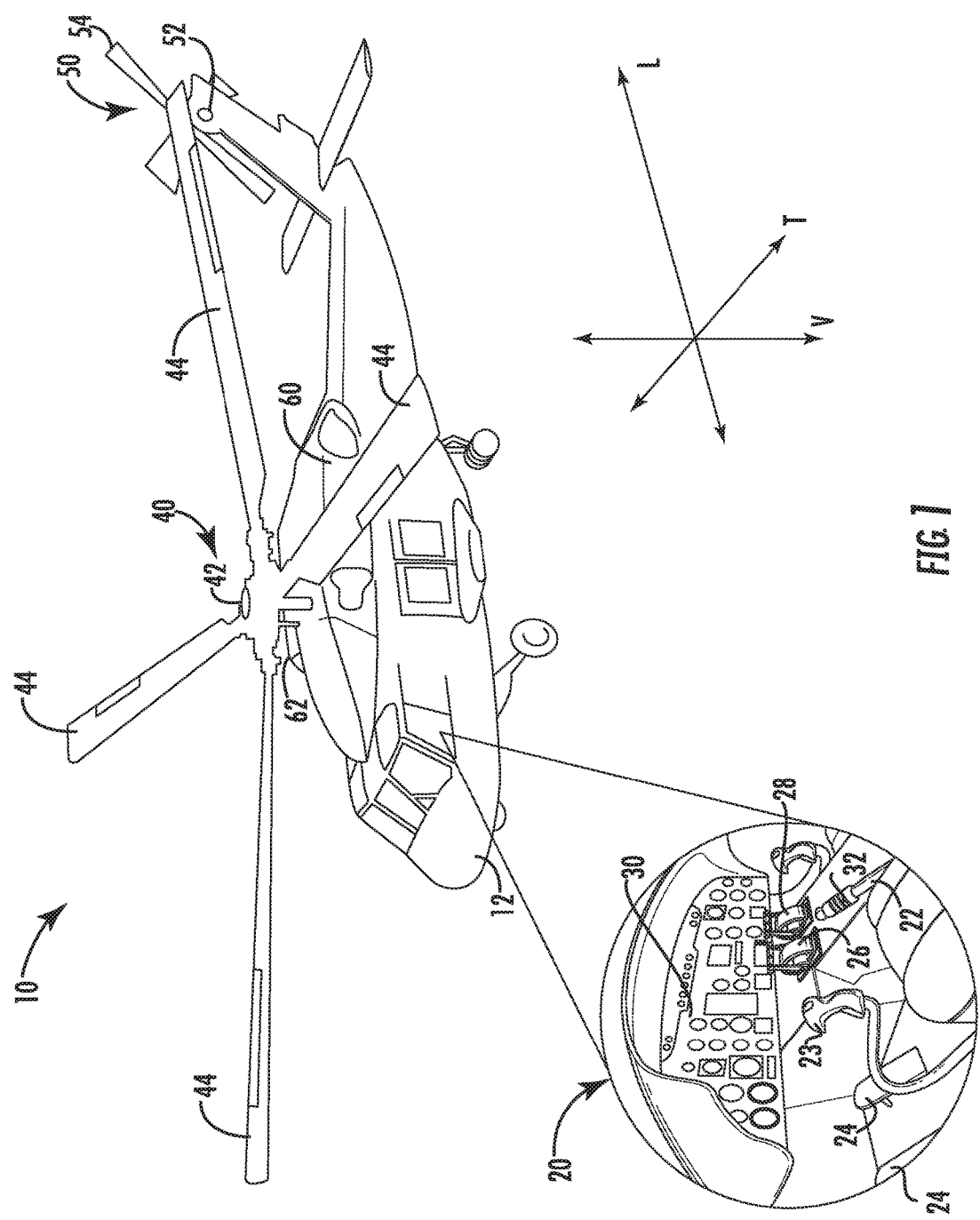
FIG. 1 is a top view of an aircraft according to various exemplary embodiments of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to a flow in a pathway. For example, with respect to a fluid flow, "upstream" refers to the direction from which the fluid flows, and "downstream" refers to the direction to which the fluid flows. However, the terms "upstream" and "downstream" as used herein may also refer to a flow of electricity.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a twenty percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

The present disclosure is generally related to a method for operating a gas turbine engine of a hybrid electric propulsion system of an aircraft in a manner to reduce a number of minor cycles throughout a flight envelope of the aircraft. In at least certain exemplary aspects of the present disclosure, the method includes determining a baseline power output for the gas turbine engine and operating the gas turbine engine to provide the baseline power output. The baseline power output may generally be an expected average desired power output for the gas turbine engine through a relevant phase of the flight envelope.

At least certain aspects of the exemplary method further include determining a desired power output that is greater than or less than the baseline power output provided, and in response, providing power to, or extracting power from, the gas turbine engine using an electric machine, such that an effective power output of the gas turbine engine matches the desired power output. For example, the electric machine may be mechanically coupled to an output shaft of the electric machine, and further may be electrically coupled to an electric energy storage unit. Providing power to the electric machine may help drive the output shaft of the gas turbine engine to increase an effective power output of the output shaft of the gas turbine engine. By contrast, extracting power from the electric machine may drag on the output shaft of the gas turbine engine to reduce an effective power output of the output shaft of the gas turbine engine.

More specifically, with such an exemplary aspect, when, for example, the desired power output is greater than the baseline power output the method may provide electrical power from the electric energy storage unit to the electric machine to increase the effective power output of the gas turbine engine, such that the effective power output of the gas turbine engine matches the desired power output. Additionally, or alternatively, when, for example, the desired power output is less than the baseline power output, the method may extract electrical power from the electric machine to the electric energy storage unit to decrease the effective power output of the gas turbine engine, such that the effective power output of the gas turbine engine matches the desired power output.

Additionally, it will be appreciated that in at least certain exemplary aspects of the disclosure, the above method may be utilized with a hybrid electric propulsion system having a turboshaft engine and being incorporated in a helicopter.

Operating a hybrid electric propulsion system in such an exemplary manner may have the effect of reducing a number of minor cycles on a gas turbine engine of the hybrid electric propulsion system, therefore reducing a wear on the gas turbine engine and increasing a useful life of the gas turbine engine.

Referring now to the drawings, FIG. 1 provides a perspective view of an exemplary aircraft 10 in accordance with the present disclosure. The aircraft 10 generally defines a transverse direction T, a longitudinal direction L, and a vertical direction V. In operation, the aircraft 10 may move along or around the transverse direction T, the longitudinal direction L, and/or the vertical direction V.

In the embodiment illustrated in FIG. 1, the aircraft 10 includes an airframe 12 defining a cockpit 20. As is depicted in the close-up circle A-A, the cockpit 20 includes a collective pitch input device 22, a cyclic pitch input device 23, a tail rotor input device 24, a first throttle input device 26, a second throttle input device 28, and an instrument panel 30. The aircraft 10 further includes a main rotor assembly 40 and a tail rotor assembly 50. The main rotor assembly 40 includes a main rotor hub 42 and a plurality of main rotor blades 44. As shown, each main rotor blade 44 extends outwardly from the main rotor hub 42. The tail rotor section 50 includes a tail rotor hub 52 and a plurality of tail rotor blades 54. Each tail rotor blade 54 extends outwardly from the tail rotor hub 52.

Additionally, the aircraft 10 includes a hybrid electric propulsion assembly (not labeled; see also embodiment of FIG. 2, discussed below), as will be described in greater detail below. The hybrid electric propulsion assembly generally includes a first gas turbine engine 60 and a second gas turbine engine 62. It should be appreciated, that in at least certain exemplary embodiments, one or both of the first and second gas turbine engines 60, 62 of the aircraft 10 in FIG. 1 may be configured in substantially the same manner as the gas turbine engine 102 depicted in FIG. 2, and further that the hybrid electric propulsion system may further include one or more of the additional components from the exemplary hybrid electric propulsion system depicted in FIG. 2.

Referring still to FIG. 1, the first and second gas turbine engines 60, 62 may be mechanically coupled to one another such that the first and second gas turbine engines 60, 62 operate together. For example, the first and second gas turbine engines 60, 62 may be ganged together in a gearbox by, e.g., differentials and one-way clutches (such as sprag clutches), such that they operate together.

Further, the first and second gas turbine engines 60, 62 may generally generate and transmit power to drive rotation of the main rotor blades 44 and the tail rotor blades 54. In particular, rotation of the main rotor blades 44 generates lift for the aircraft 10, while rotation of the tail rotor blades 54 generates sideward thrust at the tail rotor section 50 and counteracts torque exerted on the airframe 12 by the main rotor blades 44.

The collective pitch input device 22 adjusts a pitch angle of the main rotor blades 44 collectively (i.e., all at the same time) to increase or decrease an amount of lift the aircraft 10 derives from the main rotor blades 44 at a given rotor speed. Accordingly, manipulating the collective pitch input device 22 may cause the aircraft 10 to move in one of two opposing directions along the vertical direction V. It should be appreciated, that as will be discussed in greater detail, below, manipulating the collective pitch input device 22 may also be used to anticipate a desired power output of the hybrid electric propulsion system to the main rotor assembly 40 to generate, e.g., a desired lift of the aircraft 10.

Referring still to FIG. 1, the cyclic pitch input device 23 controls movement of the aircraft 10 about the longitudinal direction L and about the transverse direction T. In particular, the cyclic pitch input device 23 adjusts an angle of the aircraft 10 allowing the aircraft 10 to move forward or backwards along the longitudinal direction L or sideways in the transverse direction T. Additionally, the tail rotor input device 24 controls a pitch angle of the tail rotor blades 54. In operation, manipulating the tail rotor input device 24 may cause the tail rotor section 50 to move along the transverse direction T and thereby change the orientation of the aircraft 10, and rotating the aircraft 10 about the vertical direction V.

The first and second throttle input devices 24, 26 may be moved to an on position at the start of a flight and actuated during the flight to provide a desired amount of power for the aircraft 10. In certain embodiments, these input devices 24, 26 may be manually actuated, or alternatively may be actuated by one or more controllers (described below), e.g., in response to and input from the collective pitch input device 22.

Figure 2:
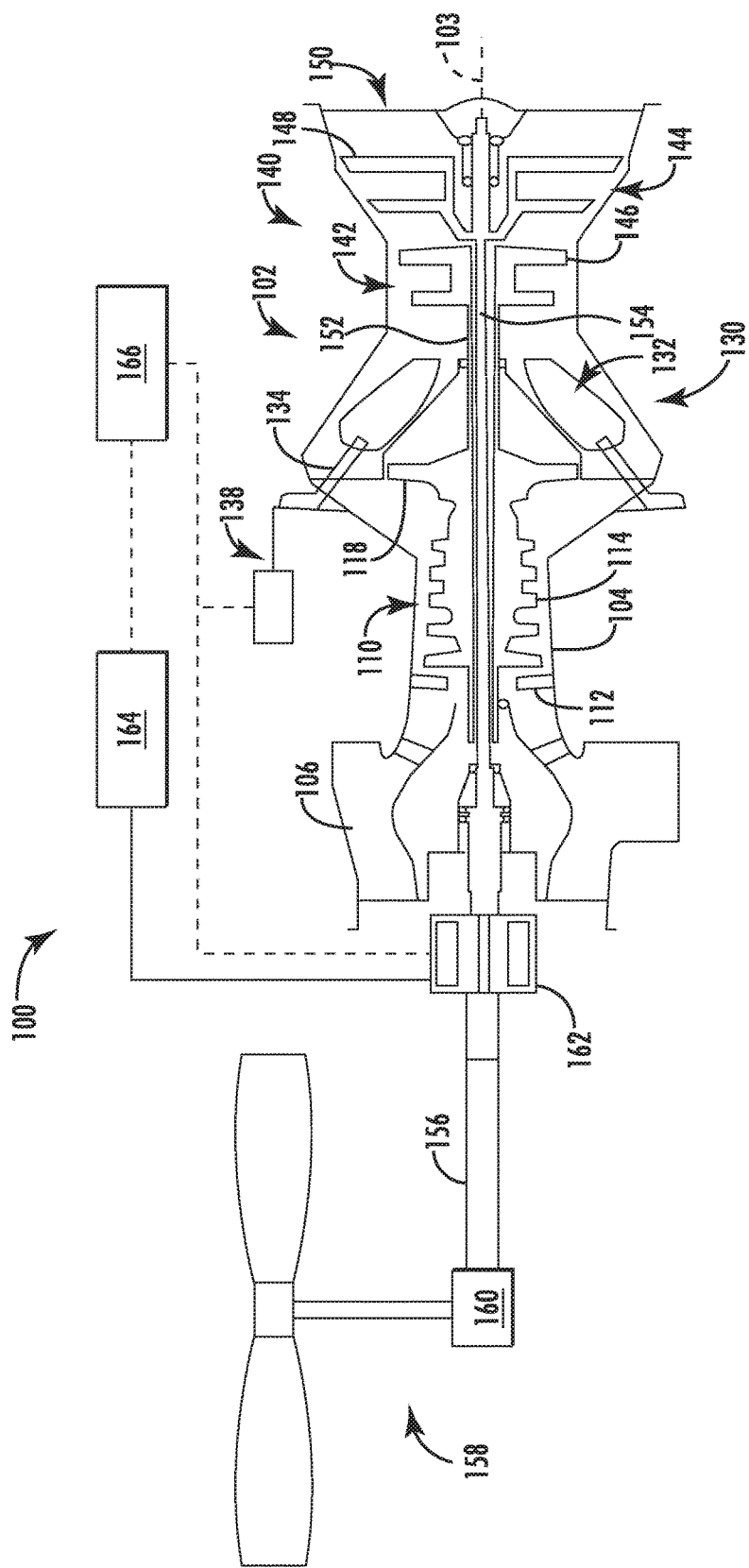
FIG. 2 is a schematic, cross-sectional view of a hybrid electric propulsion assembly in accordance with an exemplary embodiment of the present disclosure.

Referring now to FIG. 2 a schematic view is provided of a hybrid electric propulsion system 100 for an aircraft in accordance with an exemplary embodiment of the present disclosure. The exemplary hybrid electric propulsion system 100 may be incorporated into an aircraft similar to the exemplary aircraft 10 described above with reference to FIG. 1. However, in other exemplary embodiments, the hybrid electric propulsion system 100 may instead be utilized with any other suitable aircraft, as described below.

For the embodiment depicted, the hybrid electric propulsion system 100 generally includes a gas turbine engine 102, a prime propulsor mechanically coupled to the gas turbine engine 102, an electric machine 162 also mechanically coupled to the gas turbine engine 102, an electric energy storage unit 164, and a controller 166. Functionality of each of these components is as follows.

With reference first to the gas turbine engine 102, a cross-sectional view is provided. As is depicted, the gas turbine engine 102 defines a longitudinal or centerline axis 103 extending therethrough for reference. The gas turbine engine 102 generally includes a substantially tubular outer casing 104 that defines an inlet 106. The outer casing 104 encloses, in serial flow relationship, a gas generator compressor 110 (or high pressure compressor), a combustion section 130, a turbine section 140, and an exhaust section 150. The exemplary gas generator compressor 110 depicted includes an annular array of inlet guide vanes 112, one or more sequential stages of compressor blades 114, and a stage of centrifugal rotor blades 118. Although not depicted, the gas generator compressor 110 may also include a plurality of fixed or variable stator vanes.

The combustion section 130 generally includes a combustion chamber 132, one or more fuel nozzles 134 extending into the combustion chamber 132, and a fuel delivery system 138. The fuel delivery system 138 is configured to provide fuel to the one or more fuel nozzles 134, which, in turn, supply fuel to mix with compressed air from the gas generator compressor 110 entering the combustion chamber 132. Further, the mixture of fuel and compressed air is ignited within the combustion chamber 132 to form combustion gases. As will be described below in more detail, the combustion gases drive both the gas generator compressor 110 and the turbines within the turbine section 140.

More specifically, the turbine section 140 includes a gas generator turbine 142 (or high pressure turbine) and a power turbine 144 (or low pressure turbine). The gas generator turbine 142 includes one or more sequential stages of turbine rotor blades 146, and may further include one or more sequential stages of stator vanes (not shown). Likewise, the power turbine 144 includes one or more sequential stages of turbine rotor blades 148, and may further include one or more sequential stages of stator vanes (also not shown). Additionally, the gas generator turbine 142 is drivingly connected to the gas generator compressor 110 via a gas generator shaft 152, and the power turbine 144 is drivingly connected to an output shaft 156 via a power turbine shaft 154.

In operation, the combustion gases drive both the gas generator turbine 142 and the power turbine 144. As the gas generator turbine 142 rotates around the centerline axis 103, the gas generator compressor 110 and the gas generator shaft 152 both also rotate around the centerline axis 103. Further, as the power turbine 144 rotates, the power turbine shaft 154 rotates and transfers rotational energy to the output shaft 156. Accordingly, it will be appreciated that the gas generator turbine 142 drives the gas generator compressor 110 and the power turbine 144 drives the output shaft 156.

It should be appreciated, however, that in other exemplary embodiments, the gas turbine engine 102 of FIG. 2 may instead have any other suitable configuration. For example, in other exemplary embodiments, the combustion section 130 may include a reverse flow combustor, the gas turbine engine may include any suitable number of compressors, spools, and turbines, etc.

Referring still to FIG. 2, the output shaft 156 is configured to rotate the prime propulsor of the hybrid electric propulsion system 100, which for the exemplary embodiment depicted is a main rotor assembly 158 (which may be configured in substantially the same manner as the exemplary main rotor assembly 40 of the aircraft 10 of FIG. 1). Notably, the output shaft 156 is mechanically coupled to the main rotor assembly 158 through a gearbox 160. However, in other exemplary embodiments, the output shaft 156 may be coupled to the main rotor assembly 158 in any other suitable manner.

Further, as previously stated, the exemplary hybrid electric propulsion system 100 includes the electric machine 162, which may be configured as an electric motor/generator, and the electric energy storage unit 164. For the embodiment depicted, the electric machine 162 is directly mechanically coupled to the output shaft 156 of the gas turbine engine 102 (i.e., a rotor of the electric machine 162 is mounted to the output shaft 156). However, in other exemplary embodiments, the electric machine 162 may instead be mechanically coupled to the output shaft 156 in any other suitable manner, such as through a suitable gear train. Accordingly, it will be appreciated that the electric machine 162 may be configured to convert electrical power received to mechanical power (i.e., function as an electric motor), and further may be configured to receive mechanical power and convert such mechanical power to electrical power (i.e., function as an electric generator). Therefore, it will be appreciated that the electric machine 162 may be configured to increase or decrease an effective mechanical power output of the gas turbine engine 102, and more particularly of the output shaft 156 of the gas turbine engine 102 by adding power to, or extracting power from, the output shaft 156.

Particularly, for the embodiment depicted, the hybrid electric propulsion system 100 is configured to add power to, or extract power from, the gas turbine engine 102 using the electric machine 162 by way of an electrical connection between the electric motor 162 and the electric energy storage unit 164. The electric energy storage unit 164 may be any component suitable for receiving, storing, and providing electrical power. For example, the electric energy storage unit 164 may be a battery pack, such as a plurality of lithium-ion batteries. In other embodiments, however, any other suitable chemistry of batteries may be utilized. Further, in at least certain exemplary embodiments, the electric energy storage unit 164 may be configured to hold at least about twenty kilowatt-hours of electrical power. For example, in certain exemplary embodiments, the electric energy storage unit 164 may be configured to store at least about thirty kilowatt-hours of electrical power, such as at least about fifty kilowatt-hours of electrical power, such as at least about sixty kilowatt-hours of electrical power, such as up to about five hundred kilowatts hours of electrical power. Moreover, the electric machine 162 may be a relatively powerful electric machine. For example, in certain exemplary embodiments, the electric machine 162 may be configured to generate at least about seventy-five kilowatts of electrical power, or at least about one hundred horsepower of mechanical power. For example, in certain exemplary embodiments, the electric machine 162 may be configured to generate up to about one hundred and fifty kilowatts of electrical power and up to at least about two hundred horsepower of mechanical power, such as up to about seven hundred and fifty kilowatts of electrical power and up to at least about one thousand horsepower of mechanical power.

More particularly, for the embodiment depicted, the controller 166 is operably connected to, e.g., the electric machine 162 and the electric energy storage unit 164 and configured to electrically connect these components and direct electrical power between these components. Accordingly, the controller 166 may be configured to operate the hybrid electric propulsion system 100 between a power extraction mode and a power addition mode. In the power extraction mode, mechanical power from the output shaft 156 is converted by the electric machine 162 to electrical power and extracted to the electric energy storage unit 164. Such extraction of electrical power may act as a drag on the output shaft 156, reducing an effective power output of the gas turbine engine 102, and more particularly, an effective output power of the output shaft 156 of the gas turbine engine 102. By contrast, in the power addition mode, electrical power from the electric energy storage unit 164 is provided to the electric machine 162 and converted to mechanical power added to the output shaft 156. Such addition of mechanical power may act as a boost on the output shaft 156, increasing an effective power output of the gas turbine engine 102, and more particularly, an effective power output of the output shaft 156 of the gas turbine engine 102. An exemplary aspect of how such operation may function is described below with reference to the method 200 of FIG. 3.

As will be appreciated, in certain exemplary embodiments, the hybrid electric propulsion system 100 may further include various power electronics components operable with the controller 166 to facilitate the controller 166 directing the electrical power to and/or from electric energy storage unit 164. These various power electronics components may further convert and/or condition electrical power provided between these components as necessary or desired.

Generally, a hybrid electric propulsion system configured in accordance with one or more these embodiments may allow for a reduction in minor cycle damage (i.e., damage to/wear on various components of the engine due to repeated changes in power levels or loads during flight) and/or low cycle fatigue to the gas turbine engine by generally operating the gas turbine engine at a baseline power level, and adding power to, or extracting power from, the output shaft using the electric machine and the electric energy storage unit as needed to meet a desired power output of the aircraft. For example, the controller of the hybrid electric propulsion system may generally be configured to direct power to an electric machine coupled to an output shaft of the gas turbine engine to increase an effective power output of the gas turbine engine when a desired power output is greater than a baseline power at which the gas turbine engine is operated, and further may be configured to extract power from the electric machine coupled to the output shaft of the gas turbine engine to reduce the effective power output of the gas turbine engine when a desired power output is less than the baseline power at which the gas turbine engine is operated.

It should also be appreciated that, although a particular aircraft and hybrid electric propulsion system have been illustrated and described, other configurations and/or aircraft may benefit from a hybrid electric propulsion system configured in accordance with one or more the above exemplary embodiments. For example, in other exemplary embodiments, the aircraft may be any other suitable rotary wing aircraft, typically referred to as a helicopter. Additionally, or alternatively, the aircraft may instead be configured as a vertical takeoff and landing aircraft, a fixed wing aircraft commonly referred to as an airplane, etc.

Figure 3:
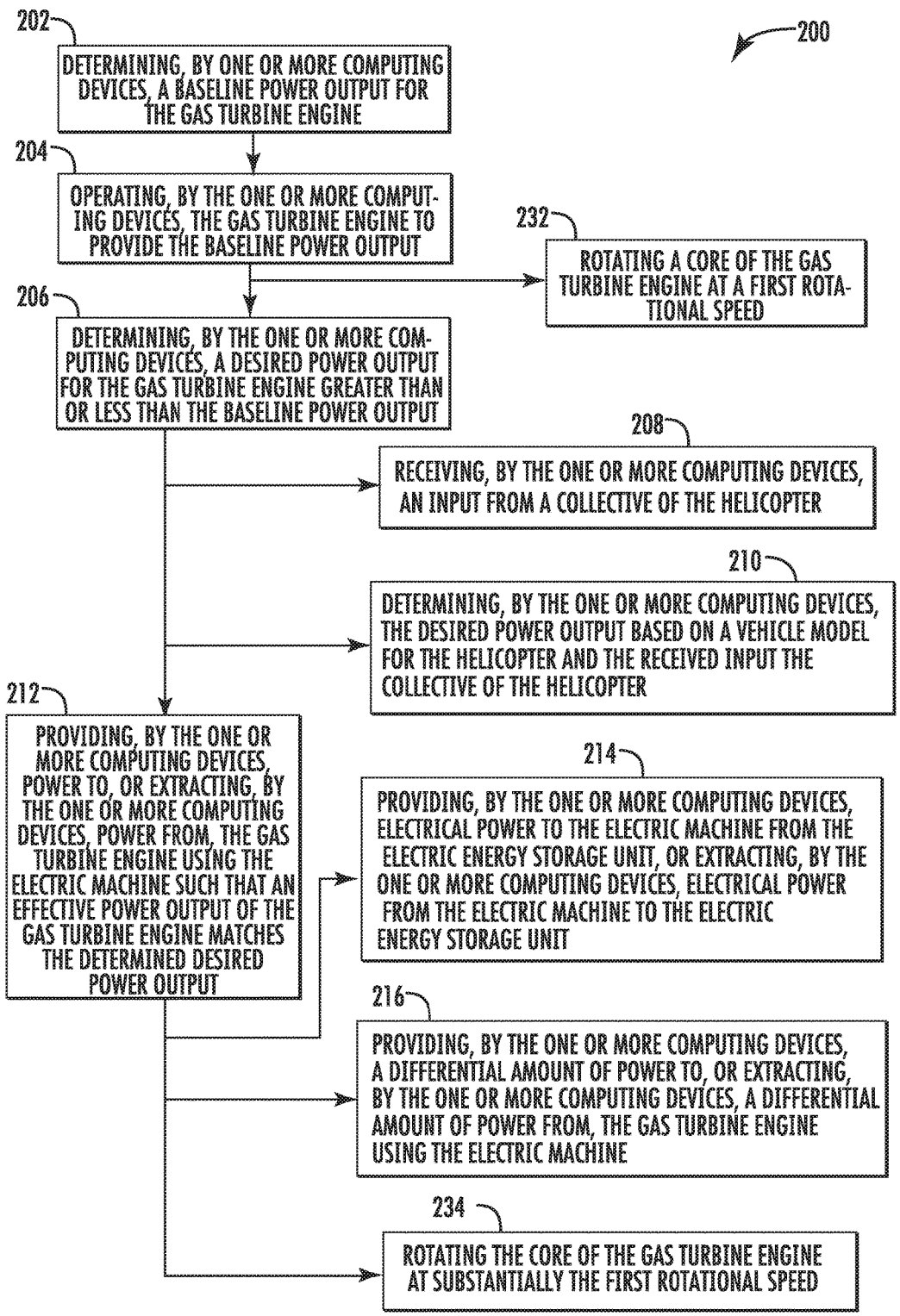
FIG. 3 is a flow diagram of a method for operating a hybrid electric propulsion system of an aircraft in accordance with an exemplary aspect of the present disclosure.

Referring now to FIG. 3, a computer-implemented method 200 for operating a gas turbine engine of a hybrid electric propulsion system of an aircraft in accordance with an exemplary aspect of the present disclosure is provided. In certain exemplary aspects, the exemplary method 200 of FIG. 3 may be utilized with the exemplary hybrid electric propulsion system described above with reference to FIG. 2. Accordingly, the exemplary hybrid electric propulsion system operated in accordance with the exemplary method 200 may generally include a gas turbine engine with an electric machine coupled thereto, as well as an electric energy storage unit electrically connectable to the electric machine. However, in other exemplary aspects, the method 200 may alternatively be utilized with any other suitable hybrid electric propulsion system and/or aircraft.

The exemplary method generally includes at (202) determining, by one or more computing devices, a baseline power output for the gas turbine engine. The baseline power output determined at (202) may be based on a user input, may be selected based on an expected flight envelope, or in any other suitable manner. The baseline power output is generally an expected average desired power output for the gas turbine engine for a current or anticipated flight phase. Additionally, the method 200 includes at (204) operating, by the one or more computing devices, the gas turbine engine to provide the baseline power output. Notably, operating, by the one or more computing devices, the gas turbine engine to provide the baseline power output at (204) may include providing the baseline power output to an output shaft of the gas turbine engine.

Moreover, referring still to FIG. 3, the exemplary method 200 includes determining, by the one or more computing devices, a desired power output, and more specifically at (206) determining, by the one or more computing devices, a desired power output for the gas turbine engine greater than or less than the baseline power output determined at (202).

As described above, in certain exemplary aspects, such as the exemplary aspect of the method 200 depicted in FIG. 3, the aircraft may be a helicopter. Accordingly, for the exemplary aspect of the method 200 depicted, determining, by the one or more computing devices, the desired power output greater than or less than the baseline power output at (206) additionally includes at (208) receiving, by the one or more computing devices, an input from a collective of the helicopter, and at (210) determining, by the one or more computing devices, the desired power output based on a vehicle model for the helicopter and the received input the collective of the helicopter at (208). The vehicle model may be any suitable model for determining a desired power output based at least in part on collective position. For example, the vehicle model may be a model of output torque versus collective position for a given set of parameters, such as ambient temperature, altitude, etc. Notably, however, in other exemplary aspects, the method 200 may determine a desired power output at (206) in any other suitable manner. For example, in other exemplary aspects, the method 200 may determine a desired power output at (206) based at least in part on a state of charge of the electric energy storage device, a charge rate of the electric energy storage device, etc.

Further, referring still to FIG. 3, the exemplary method 200 additionally includes at (212) providing, by the one or more computing devices, power to, or extracting, by the one or more computing devices, power from, the gas turbine engine using the electric machine such that an effective power output of the gas turbine engine matches the desired power output determined at (206). For example, in certain exemplary aspects, the aircraft may be a helicopter including a main rotor (see FIG. 1) and the gas turbine engine may be a turboshaft engine including an output shaft, with the output shaft drivingly coupled to the main rotor, and with the electric machine coupled to the output shaft (see FIG. 2). With such an exemplary aspect, the electric machine may accordingly add power to, or extract power from, the gas turbine engine, or rather add power to, or extract power from, the output shaft of the gas turbine engine, such that an effective power output matches desired power output.

More specifically, for the exemplary aspect of FIG. 3, the hybrid electric propulsion system further includes an electric energy storage unit electrically connected to (or connectable to) the electric machine. With such an exemplary aspect, providing, by the one or more computing devices, power to, or extracting, by the one or more computing devices, power from, the gas turbine engine using the electric machine such that an effective power output of the gas turbine engine matches the desired power output at (212) includes at (214) providing, by the one or more computing devices, electrical power to the electric machine from the electric energy storage unit, or extracting, by the one or more computing devices, electrical power from the electric machine to the electric energy storage unit. In such a manner, the electric machine may increase or decrease the effective power output of the gas turbine engine by acting as a drag on the output shaft the gas turbine engine (i.e., when the electric energy storage unit extracts electrical power from the electric machine), or by acting as a boost for the output shaft of the gas turbine engine (i.e., when the electric energy storage unit provides electrical power to the electric machine).

Moreover, as is depicted, in certain exemplary aspects, providing, by the one or more computing devices, power to, or extracting, by the one or more computing devices, power from, the gas turbine engine using the electric machine at (212) includes at (216) providing, by the one or more computing devices, a differential amount of power to, or extracting, by the one or more computing devices, a differential amount of power from, the gas turbine engine using the electric machine. The differential amount of power may be between about one percent and about twenty percent of the baseline power output, with the baseline power output expressed in horsepower.

By way of example only, in certain exemplary aspects of the method 200, the method 200 may determine a baseline power output at (202) equal to 3,000 horsepower, and may operate the gas turbine engine to provide 3,000 horsepower at (204). In addition, the method 200, in this particular example, may determine a desired power output of 3,200 horsepower at (206). The method 200 may then provide power to the gas turbine engine using the electric machine such that an effective power output of the gas turbine engine matches the desired power output. More particularly, the method 200 may provide electrical power to the electric machine from the electric energy storage unit, such that the electric machine may provide additional power to the output shaft of the gas turbine engine such that the effective power output of the gas turbine engine, or rather of the output shaft of the gas turbine engine, matches the desired power output. Notably, with such an example, the differential amount of power provided by the electric machine to the output shaft of the gas turbine engine is equal to about 200 horsepower.

Also by way of example only, in another exemplary aspect, the method 200 may determine a baseline power output at (202) equal to 4,000 horsepower, and may operate the gas turbine engine to provide 4,000 horsepower at (204). Further, with such an example, the method 200 may determine a desired power output of 3,600 horsepower at (206). The method 200 may accordingly extract power from the gas turbine engine, or rather from the output shaft the gas turbine engine, using the electric machine such that an effective power output of the gas turbine engine matches the desired power output. More particularly, the method 200 may extract electrical power from the electric machine to the electric energy storage unit, the electric machine coupled to an output shaft of the gas turbine engine and acting as a drag on the output shaft during such power extraction to reduce the effective power output of the output shaft. Accordingly, the electric machine may reduce the baseline power output of the gas turbine engine such that the effective power output of the gas turbine engine matches the desired power output.

Of course, in other exemplary aspects, the baseline power output may be any other suitable value, and similarly, the differential power output may also be any other suitable value.

Figure 4:
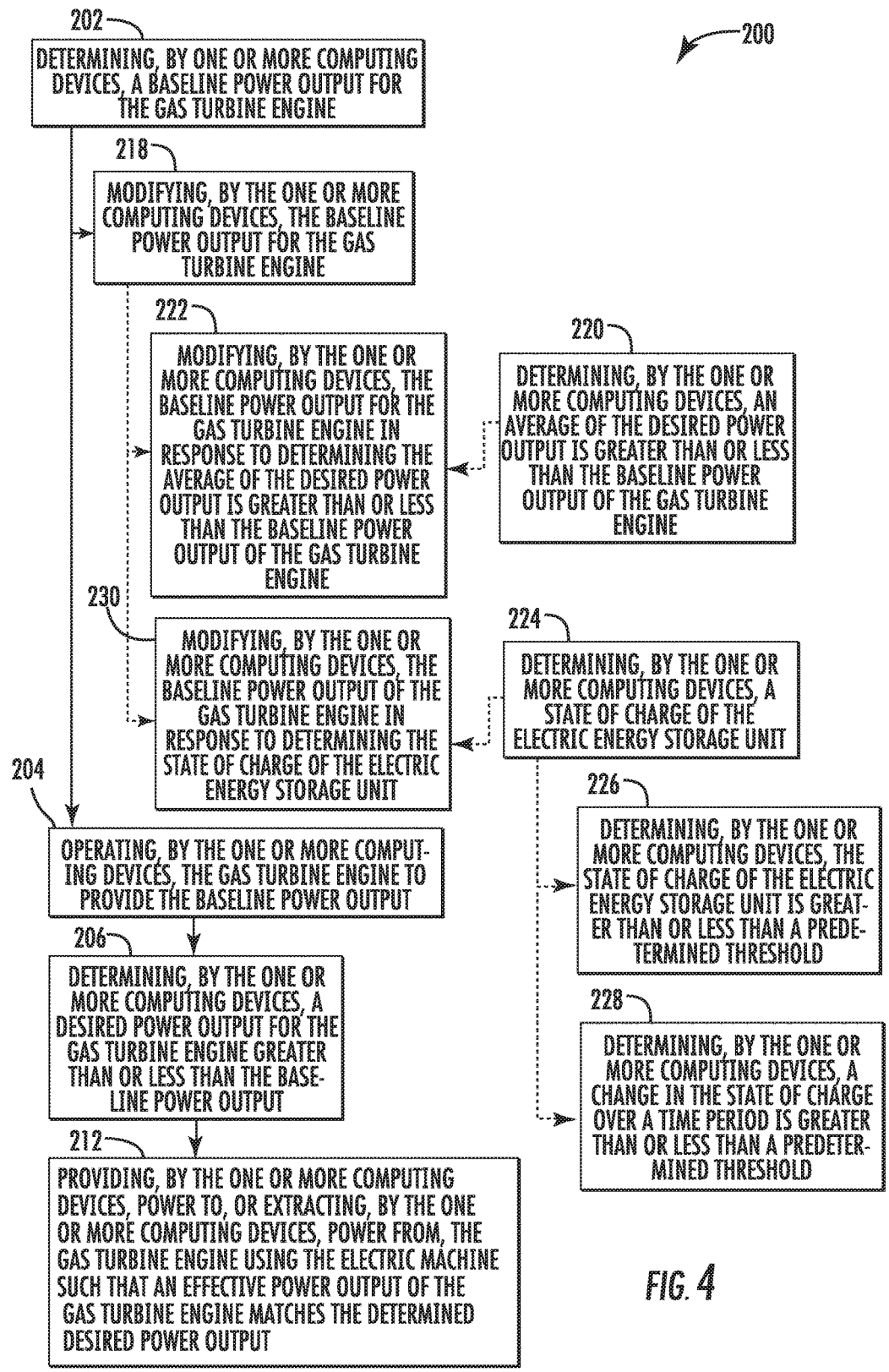
FIG. 4 is a flow diagram of an exemplary aspect of the method of FIG. 3.

Referring now to FIG. 4, a flow diagram of an exemplary aspect of the method 200 of FIG. 3 is depicted. For example, as is depicted in FIG. 4, in certain exemplary aspects of the method 200, during the course of operation of the gas turbine engine of the hybrid electric propulsion system it may be determined that the baseline power output needs to be adjusted. Accordingly, for the exemplary aspect of FIG. 4, determining, by the one or more computing devices, the baseline power output for the gas turbine engine at (202) further includes at (218) modifying, by the one or more computing devices, the baseline power output for the gas turbine engine.

More specifically, in certain exemplary aspects, as is depicted in phantom, the method 200 may further include at (220) determining, by the one or more computing devices, an average of the desired power output is greater than or less than the baseline power output of the gas turbine engine. With such an exemplary aspect, modifying, by the one or more computing devices, the baseline power output for the gas turbine engine at (218) may include at (222) modifying, by the one or more computing devices, the baseline power output for the gas turbine engine in response to determining the average of the desired power output is greater than or less than the baseline power output of the gas turbine engine at (220).

Additionally, or alternatively, as is also depicted in phantom, the method 200 may include at (224) determining, by the one or more computing devices, a state of charge of the electric energy storage unit. Determining, by the one or more computing devices, the state of charge of the electric energy storage unit at (224) may further include at (226) determining, by the one or more computing devices, the state of charge of the electric energy storage unit is greater than or less than a predetermined threshold. Additionally, or alternatively, in other exemplary aspects, determining, by the one or more computing devices, the state of charge of the electric energy storage unit at (224) may further include at (228) determining, by the one or more computing devices, a change in the state of charge over a time period is greater than or less than a predetermined threshold (i.e., that a rate of change of the state of charge is greater than or less than a predetermined threshold).

Accordingly, it will be appreciated that in certain exemplary aspects, modifying, by the one or more computing devices, the baseline power output of the gas turbine engine at (218), may further include at (230) modifying, by the one or more computing devices, the baseline power output of the gas turbine engine in response to determining the state of charge of the electric energy storage unit at (224), such as in response to determining the state of charge of the electric energy storage unit is greater than or less than the predetermined threshold at (226), and/or determining the change in the state of charge over the period of time is greater than or less than the predetermined threshold at (228).

Operating a hybrid electric propulsion system of an aircraft in accordance with one or more the exemplary aspects of the method 200 described above may allow for the electric machine and electric energy storage unit to provide a differential amount of power required for the aircraft between a baseline power output of the gas turbine engine and a desired power output for the gas turbine engine (e.g., at least about thirty minutes, such as at least about one hour, such as at least about two hours, such as up to about 95% of a flight time of a particular flight). Such may accordingly allow for the gas turbine engine may be operated in a consistent state, i.e., at a consistent power level for a longer duration of time. Such may greatly reduce number of minor cycles of the gas turbine engine throughout operation of the hybrid electric propulsion system during a flight envelope, elongating a lifespan of the gas turbine engine.

For example, referring back to FIG. 3, in the embodiment depicted, operating, by the one or more computing devices, the gas turbine engine to provide the baseline power output at (204) further comprises at (232) rotating a core of the gas turbine engine, e.g., a gas generator compressor and gas generator turbine, at a first rotational speed. Moreover, for the exemplary aspect depicted, providing, by the one or more computing devices, power to, or extracting, by the one or more computing devices, power from, the gas turbine engine using the electric machine such that the effective power output of the gas turbine engine matches the desired power output at (212) includes at (234) rotating the core of the gas turbine engine at substantially the first rotational speed (e.g., within a five percent margin). Accordingly, it will be appreciated, that the differentials in the effective power outputs in these scenarios are made up through providing power to, and extracting power from, the electric machine coupled to the output shaft of the gas turbine engine.

Figure 5:
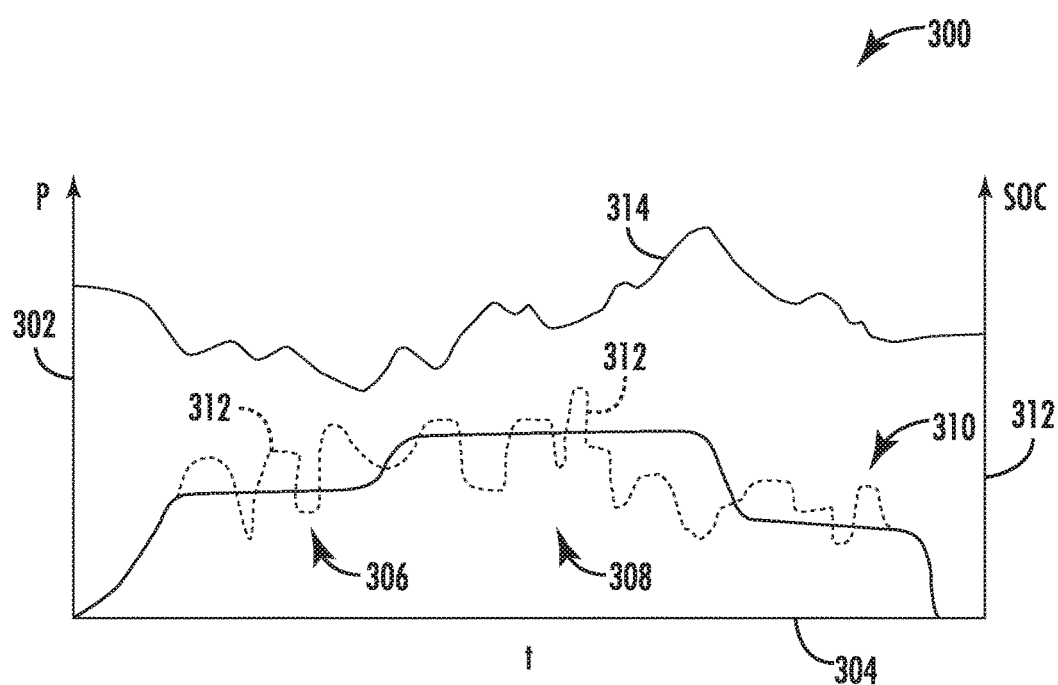
FIG. 5 is a chart depicting a power output level of a gas turbine engine of a hybrid electric propulsion system operated in accordance with an exemplary aspect of the present disclosure.

Further, referring now briefly to FIG. 5, a chart 300 is provided depicting a power output level of a gas turbine engine of the hybrid electric propulsion system operated in accordance with an exemplary aspect of the present disclosure. The chart 300 depicts an effective power output on a first y-axis 302, over time on the x-axis 304. As is depicted, the gas turbine engine it is generally operated a first baseline power output 306 for a first time duration, at a second baseline power output 308 for a second time duration, and at a third baseline power output 310 for a third time duration.

Notably, the chart 300 further depicts, in phantom, a line 312 showing a desired power output. As shown, the desired power output goes through many more cycles (i.e., increases and decreases in amounts of power output) throughout the flight envelope. The differentials between the baseline power output and the effective power output are made up through addition of power to, or extraction of power from, the gas turbine engine using an electric machine coupled to an output shaft of the gas turbine engine, as well as an electric energy storage unit electrically connectable to the electric machine.

The chart 300 further shows a state of charge at line 314 of the electric energy storage unit through the flight envelope on a second y-axis 315 over the same time period on the x-axis 304. As is depicted, for the exemplary aspect shown, the baseline power output is modified based on the state of charge (i.e., increased when the state of charge falls below a threshold and decreased when the state of charge goes above a threshold). For example, the increase from the first baseline power output at 306 to the second baseline power output at 308 is, for the embodiment depicted, in response to the state of charge falling below a minimum threshold, and similarly, the decrease from the second baseline power output at 308 to the third baseline power output at 310 is, for the embodiment depicted, in response to the state of charge climbing above a maximum threshold. Notably, however, in other exemplary aspects, one or more of these changes to the baseline power outputs may be in response to an average desired power output being greater than or less than the baseline power output for, e.g., a predetermined amount of time, in response to a rate of change of the state of charge, or a combination thereof.

Figure 6:
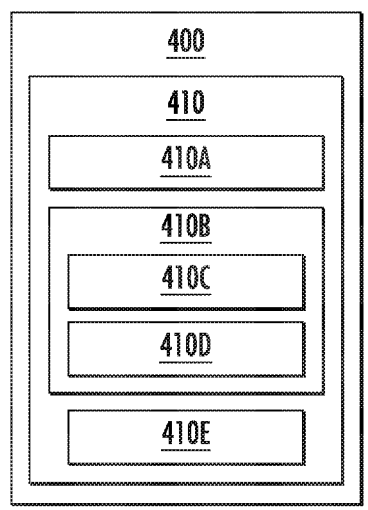
FIG. 6 is a computing system according to example aspects of the present disclosure.

Referring now to FIG. 6, an example computing system 400 according to example embodiments of the present disclosure is depicted. The computing system 400 can be used, for example, as a controller 166 in a hybrid electric propulsion system 100. The computing system 400 can include one or more computing device(s) 410. The computing device(s) 410 can include one or more processor(s) 410A and one or more memory device(s) 410B. The one or more processor(s) 410A can include any suitable processing device, such as a microprocessor, microcontroller, integrated circuit, logic device, and/or other suitable processing device. The one or more memory device(s) 410B can include one or more computer-readable media, including, but not limited to, non-transitory computer-readable media, RAM, ROM, hard drives, flash drives, and/or other memory devices.

The one or more memory device(s) 410B can store information accessible by the one or more processor(s) 410A, including computer-readable instructions 410C that can be executed by the one or more processor(s) 410A. The instructions 410C can be any set of instructions that when executed by the one or more processor(s) 410A, cause the one or more processor(s) 410A to perform operations. In some embodiments, the instructions 410C can be executed by the one or more processor(s) 410A to cause the one or more processor(s) 410A to perform operations, such as any of the operations and functions for which the computing system 400 and/or the computing device(s) 410 are configured, the operations for operating a hybrid electric propulsion system of an aircraft (e.g, method 200), as described herein, and/or any other operations or functions of the one or more computing device(s) 410. Accordingly, in one or more exemplary embodiments, the exemplary method 200 may be a computer-implemented method. The instructions 410C can be software written in any suitable programming language or can be implemented in hardware. Additionally, and/or alternatively, the instructions 410C can be executed in logically and/or virtually separate threads on processor(s) 410A. The memory device(s) 410B can further store data 410D that can be accessed by the processor(s) 410A. For example, the data 410D can include data indicative of power flows, data indicative of power demands of various loads in a hybrid electric propulsion system, data indicative of operating parameters of a hybrid electric propulsion system, including, power output demands, rotational speeds of the gas turbine engines, power levels of electric energy storage units, etc.

The computing device(s) 410 can also include a network interface 410E used to communicate, for example, with the other components of system 400 (e.g., via a network). The network interface 410E can include any suitable components for interfacing with one or more network(s), including for example, transmitters, receivers, ports, controllers, antennas, and/or other suitable components. One or more external display devices (not depicted) can be configured to receive one or more commands from the computing device(s) 410.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for operating a hybrid electric propulsion system of an aircraft, the hybrid electric propulsion system comprising a gas turbine engine and an electric machine coupled to the gas turbine engine, the method comprising:
   determining, by one or more computing devices, a baseline power output for the gas turbine engine;
   operating, by the one or more computing devices, the gas turbine engine to provide the baseline power output;
   determining, by the one or more computing devices, a desired power output greater than or less than the baseline power output; and
   providing, by the one or more computing devices, a differential amount of power to, or extracting, by the one or more computing devices, a differential amount of power from, the gas turbine engine using the electric machine such that an effective power output of the gas turbine engine matches the determined desired power output;
   wherein the differential amount of power is between about one percent and about twenty percent of the baseline output.

2. The method of claim 1, wherein the hybrid electric propulsion system further comprises an electric energy storage unit electrically connected to the electric machine.

3. The method of claim 2, wherein providing, by the one or more computing devices, a differential amount of power to, or extracting, by the one or more computing devices, a differential amount of power from, the gas turbine engine using the electric machine such that the effective power output of the gas turbine engine matches the determined desired power output comprises
   providing, by the one or more computing devices, electrical power to the electric machine from the electric energy storage unit, or
   extracting, by the one or more computing devices, electrical power from the electric machine to the electric energy storage unit.

4. The method of claim 2, further comprising:
   determining, by the one or more computing devices, an average of the desired power output is greater than or less than the baseline power output of the gas turbine engine, and
   wherein determining, by one or more computing devices, the baseline power output for the gas turbine engine comprises
      modifying, by the one or more computing devices, the baseline power output in response to determining the average of the desired power output is greater than or less than the baseline power output of the gas turbine engine.

5. The method of claim 2, further comprising:
   determining, by the one or more computing devices, a state of charge of the electric energy storage unit, and
   wherein determining, by one or more computing devices, the baseline power output for the gas turbine engine comprises
      modifying, by the one or more computing devices, the baseline power output in response to determining the state of charge of the electric energy storage unit.

6. The method of claim 5, wherein determining, by the one or more computing devices, the state of charge of the electric energy storage unit further comprises determining, by the one or more computing devices, the state of charge is greater than or less than a predetermined threshold.

7. The method of claim 5, wherein determining, by the one or more computing devices, the state of charge of the electric energy storage unit further comprises
   determining, by the one or more computing devices, a change in the state of charge over a time period is greater than or less than a predetermined threshold.

8. The method of claim 1, wherein the gas turbine engine is a turboshaft engine including an output shaft and wherein the electric machine is coupled to the output shaft.

9. The method of claim 8, wherein the aircraft is a helicopter having a propeller, and wherein the output shaft drives the propeller.

10. The method of claim 9, wherein determining, by the one or more computing devices, the desired power output greater than or less than the baseline power output comprises:
    receiving, by the one or more computing devices, an input from a collective of the helicopter; and
    determining, by the one or more computing devices, the desired power output based on a vehicle model and the received input from the collective of the helicopter.

11. The method of claim 1,
    wherein operating, by the one or more computing devices, the gas turbine engine to provide the baseline power output comprises
       rotating a core of the gas turbine engine at a first rotational speed, and
    wherein providing, by the one or more computing devices, power to, or extracting, by the one or more computing devices, power from, the gas turbine engine using the electric machine such that the effective power output of the gas turbine engine matches the determined desired power output comprises
rotating the core of the gas turbine engine at substantially the first rotational speed.

12. A hybrid electric propulsion system for an aircraft comprising:
a gas turbine engine comprising a turbine and an output shaft, the turbine drivingly coupled to the output shaft;
an electric machine coupled to the output shaft through a gear train,
a controller comprising memory and one or more processors, the memory storing instructions that when executed by the one or more processors cause the hybrid electric propulsion system to perform functions, the functions including:
determining a baseline power output for the gas turbine engine;
operating the gas turbine engine to provide the baseline power output;
determining a desired power output greater than or less than the baseline power output; and
providing a differential amount of power to, or extracting a differential amount of power from, the gas turbine engine using the electric machine such that an effective power output of the gas turbine engine matches the determined desired power output.

13. The hybrid electric propulsion system of claim 12, wherein the gas turbine engine is a turboshaft engine.

14. The hybrid electric propulsion system of claim 13, wherein the aircraft is a helicopter having a propeller, and wherein the output shaft is configured to drive the propeller.

15. The hybrid electric propulsion system of claim 14, wherein determining the desired power output comprises:
receiving an input from a collective of the helicopter; and
determining the desired power output based on a vehicle model and the received input from the collective of the helicopter.

16. The hybrid electric propulsion system of claim 12, further comprising:
an electric energy storage unit electrically connectable to the electric machine.

17. The hybrid electric propulsion system of claim 16, wherein providing a differential amount of power to, or extracting a differential amount of power from, the gas turbine engine using the electric machine such that the effective power output of the gas turbine engine matches the determined desired power output comprises
providing power to the electric machine from the electric energy storage unit, or
extracting power from the electric machine to the electric energy storage unit.

18. The hybrid electric propulsion system of claim 12, wherein the differential amount of power is between about one percent and about twenty percent of the baseline power output.

19. A method for operating a hybrid electric propulsion system of an aircraft, the hybrid electric propulsion system comprising a gas turbine engine, an electric machine coupled to the gas turbine engine, and an electric energy storage unit electrically connected to the electric machine, the method comprising:
determining, by one or more computing devices, a baseline power output for the gas turbine engine;
operating, by the one or more computing devices, the gas turbine engine to provide the baseline power output;
determining, by the one or more computing devices, a desired power output greater than or less than the baseline power output;
determining, by the one or more computing devices, an average of the desired power output is greater than or less than the baseline power output of the gas turbine engine; and
providing, by the one or more computing devices, power to, or extracting, by the one or more computing devices, power from, the gas turbine engine using the electric machine such that an effective power output of the gas turbine engine matches the determined desired power output;
wherein determining, by one or more computing devices, the baseline power output for the gas turbine engine comprises modifying, by the one or more computing devices, the baseline power output in response to determining the average of the desired power output is greater than or less than the baseline power output of the gas turbine engine.

20. A method for operating a hybrid electric propulsion system of an aircraft, the hybrid electric propulsion system comprising a gas turbine engine, an electric machine coupled to the gas turbine engine, and an electric energy storage unit electrically connected to the electric machine, the method comprising:
determining, by the one or more computing devices, a state of charge of the electric energy storage unit;
determining, by one or more computing devices, a baseline power output for the gas turbine engine;
operating, by the one or more computing devices, the gas turbine engine to provide the baseline power output;
determining, by the one or more computing devices, a desired power output greater than or less than the baseline power output; and
providing, by the one or more computing devices, power to, or extracting, by the one or more computing devices, power from, the gas turbine engine using the electric machine such that an effective power output of the gas turbine engine matches the determined desired power output;
wherein determining, by one or more computing devices, the baseline power output for the gas turbine engine comprises modifying, by the one or more computing devices, the baseline power output in response to determining the state of charge of the electric energy storage unit.

21. A method for operating a hybrid electric propulsion system of a helicopter, the hybrid electric propulsion system comprising a turboshaft gas turbine engine and an electric machine coupled to an output shaft of the gas turbine engine, the output shaft driving a propeller of the helicopter, the method comprising:
determining, by one or more computing devices, a baseline power output for the gas turbine engine;
operating, by the one or more computing devices, the gas turbine engine to provide the baseline power output;
determining, by the one or more computing devices, a desired power output greater than or less than the baseline power output; and
providing, by the one or more computing devices, power to, or extracting, by the one or more computing devices, power from, the gas turbine engine using the electric machine such that an effective power output of the gas turbine engine matches the determined desired power output;

wherein determining, by the one or more computing devices, the desired power output greater than or less than the baseline power output comprises:
    receiving, by the one or more computing devices, an input from a collective of the helicopter; and
    determining, by the one or more computing devices, the desired power output based on a vehicle model and the received input from the collective of the helicopter.

22. A method for operating a hybrid electric propulsion system of an aircraft, the hybrid electric propulsion system comprising a gas turbine engine and an electric machine coupled to the gas turbine engine, the method comprising:
    determining, by one or more computing devices, a baseline power output for the gas turbine engine;
    operating, by the one or more computing devices, the gas turbine engine to provide the baseline power output;
    determining, by the one or more computing devices, a desired power output greater than or less than the baseline power output; and
    providing, by the one or more computing devices, power to, or extracting, by the one or more computing devices, power from, the gas turbine engine using the electric machine such that an effective power output of the gas turbine engine matches the determined desired power output;
    wherein operating, by the one or more computing devices, the gas turbine engine to provide the baseline power output comprises
        rotating a core of the gas turbine engine at a first rotational speed, and
    wherein providing, by the one or more computing devices, power to, or extracting, by the one or more computing devices, power from, the gas turbine engine using the electric machine such that the effective power output of the gas turbine engine matches the determined desired power output comprises
        rotating the core of the gas turbine engine at substantially the first rotational speed.

* * * * *